United States Patent
Cao et al.

(10) Patent No.: US 11,954,857 B2
(45) Date of Patent: Apr. 9, 2024

(54) METHOD FOR DETECTION AND PATHOLOGICAL CLASSIFICATION OF POLYPS VIA COLONOSCOPY BASED ON ANCHOR-FREE TECHNIQUE

(71) Applicant: HIGHWISE CO, LTD., Suzhou (CN)

(72) Inventors: Yu Cao, Suzhou (CN); Xinzi Sun, Suzhou (CN); Qilei Chen, Suzhou (CN); Benyuan Liu, Suzhou (CN)

(73) Assignee: HIGHWISE CO, LTD., Suzhou (CN)

( * ) Notice: Subject to any disclaimer, the term of this patent is extended or adjusted under 35 U.S.C. 154(b) by 0 days.

(21) Appl. No.: 18/269,573

(22) PCT Filed: Apr. 8, 2022

(86) PCT No.: PCT/CN2022/085841
§ 371 (c)(1),
(2) Date: Jun. 26, 2023

(87) PCT Pub. No.: WO2022/247486
PCT Pub. Date: Dec. 1, 2022

(65) Prior Publication Data
US 2024/0046463 A1    Feb. 8, 2024

(30) Foreign Application Priority Data
May 25, 2021 (CN) .......................... 202110572237.7

(51) Int. Cl.
*G06T 7/00* (2017.01)

(52) U.S. Cl.
CPC .. *G06T 7/0012* (2013.01); *G06T 2207/10024* (2013.01); *G06T 2207/10068* (2013.01);
(Continued)

(58) Field of Classification Search
None
See application file for complete search history.

(56) References Cited

U.S. PATENT DOCUMENTS

| | | | |
|---|---|---|---|
| 7,558,413 B2 * | 7/2009 | Tu | G06V 10/446 382/209 |
| 2018/0075599 A1 * | 3/2018 | Tajbakhsh | A61B 5/4255 |

(Continued)

FOREIGN PATENT DOCUMENTS

| | | |
|---|---|---|
| CN | 111476252 A | 7/2020 |
| CN | 112102317 A | 12/2020 |

(Continued)

OTHER PUBLICATIONS

Li, Kaidong, et al. "Colonoscopy polyp detection and classification: Dataset creation and comparative evaluations." Plos one 16.8 (2021): e0255809. (Year: 2021).*

(Continued)

*Primary Examiner* — Samah A Beg
(74) *Attorney, Agent, or Firm* — Bayramoglu Law Offices LLC

(57) ABSTRACT

A method for detection and pathological classification of polyps via colonoscopy based on an anchor-free technique includes: performing feature extraction on a color endoscopic image that is pretreated, enhancing and extending the extracted features, decoding the feature information of the enhanced feature and the extended feature through an anchor-free detection algorithm to acquire a polyp prediction box and a prospect prediction mask, then respectively extracting global and local feature vectors from the extended feature and the prospect prediction mask, and combining the global feature vector with the local feature vector, so as to predict the type of polyps through a full-connection layer. Through the present application, the type of polyps can be correctly predicted, and the detection rate of polyps and the accuracy rate of pathological classification are improved.

3 Claims, 3 Drawing Sheets

(52) U.S. Cl.
  CPC .............. *G06T 2207/20081* (2013.01); *G06T 2207/30032* (2013.01)

(56) References Cited

U.S. PATENT DOCUMENTS

| | | | | |
|---|---|---|---|---|
| 2018/0225820 | A1* | 8/2018 | Liang | ............... G16H 20/40 |
| 2021/0133964 | A1 | 5/2021 | Sachdev et al. | |
| 2023/0043645 | A1* | 2/2023 | Protsenko | ............... A61B 1/31 |

FOREIGN PATENT DOCUMENTS

| | | | |
|---|---|---|---|
| CN | 112200773 A | 1/2021 | |
| CN | 112200795 A | 1/2021 | |
| CN | 112465800 A | 3/2021 | |
| CN | 113837989 A | 12/2021 | |

OTHER PUBLICATIONS

Sun, Xinzi, et al. "MAF-Net: Multi-branch anchor-free detector for polyp localization and classification in colonoscopy." International Conference on Medical Imaging with Deep Learning. PMLR, 2022. (Year: 2022).*

Wan, J. J., et al. "A Polyp Detection Method Based on FBnet [J]." Computers, Materials and Continua 63.3 (2020): 1263-1272. (Year: 2020).*

Wuyang, L. I., et al. "Joint polyp detection and segmentation with heterogeneous endoscopic data." 3rd International Workshop and Challenge on Computer Vision in Endoscopy (EndoCV 2021): co-located with with the 17th IEEE International Symposium on Biomedical Imaging (ISBI 2021). CEUR-WS Team, 2021. (Year: 2021).*

Dechun Wang, et al., AFP-Net: Realtime Anchor-Free Polyp Detection in Colonoscopy, IEEE, 2019.

Zhi Tian, et al., FCOS: Fully Convolutional One-Stage Object Detection, 2019 IEEE/CVF International Conference on Computer Vision (ICCV), 2019, pp. 9626-9635.

Zhaoshen Li, et al., Expert consensus on standardization of digestive endoscopy biopsy and pathological examination in China (draft), Chin J Gastroenterol, 2014, pp. 549-553, vol. 19, No. 9.

* cited by examiner

METHOD FOR DETECTION AND PATHOLOGICAL CLASSIFICATION OF POLYPS VIA COLONOSCOPY BASED ON ANCHOR-FREE TECHNIQUE

CROSS REFERENCE TO THE RELATED APPLICATIONS

This application is the national phase entry of International Application No. PCT/CN2022/085841, filed on Apr. 8, 2022, which is based upon and claims priority to Chinese Patent Application No. 202110572237.7, filed on May 25, 2021, the entire contents of which are incorporated herein by reference.

TECHNICAL FIELD

The present application belongs to the technical field of polyp detection, and particularly relates to a method for detection and pathological classification of polyps via colonoscopy based on an anchor-free technique.

BACKGROUND

Colorectal cancer is the third most common cancer in the world and China, which is also one of main cancers leading to death. With reference to "EXPERT CONSENSUS ON THE NORMS OF ENDOSCOPIC BIOPSY AND PATHOLOGY IN CHINA (draft)" and according to Morson histological classification method, CRP is divided into adenomatous polyps (tubular adenoma, villous adenoma and mixed adenoma) and non-adenomatous polyps (inflammatory polyps and proliferative polyps). Among them, adenomatous polyps are the most common and dangerous. Although only a few of adenomatous polyps can be developed into cancer, almost all malignant polyps are developed from adenomatous polyps. Therefore, detection and pathological classification prediction of intestinal polyps play an important role in a prevention and early screening process of colorectal cancer.

Main methods for early detection and pathological classification of colonic polyps are mainly based on manually selected graphic features, such as shape, color, line, contour, etc. Because different types of polyps have similar features, and polyps and normal tissues around the polyps also have very similar features, while traditional methods based on manually selected graphic features can only be used for learning limited specific features, so such the methods cannot achieve satisfactory results. With the rapid development of neural network and deep study, methods based on convolutional neural networks (CNN) have been widely applied to the field of image recognition, including medical image recognition. In recent years, this method is also applied to the field of recognition and division of colonic polyps to a certain extent.

However, the current colonic polyp recognition methods can only be for completing a polyp detection function but cannot simultaneously achieve pathological classification of polyps.

SUMMARY

The objective of the present application is to overcome the defects in the prior art to provide a method for detection and pathological classification of polyps via colonoscopy based on an anchor-free technique. In this method, an anchor-free detection algorithm is combined with an image classification algorithm, thereby improving the detection rate of polyps and the accuracy rate of pathological classification.

To achieve the above objective, the present application adopts the following technical solution:

Provided is a method for detection and pathological classification of polyps via colonoscopy based on an anchor-free technique, comprising the following steps:

S1, pretreating a color endoscopic image;

S2, performing feature extraction on the color endoscopic image that is pretreated;

S3, introducing a feature pyramid model to enhance the feature extracted in step S2 to acquire an enhanced feature, and upward extending the enhanced feature to acquire the extended feature of a deeper layer;

S4, decoding the feature information of the enhanced feature and the extended feature through an anchor-free detection algorithm to acquire a polyp prediction box and a prospect prediction mask; and S5, extracting a global feature vector from the extended feature and extracting the prospect prediction mask from the prospect prediction mask, and combining the global feature vector with the local feature vector, so as to predict the type of polyps through a full-connection layer.

Further, the step S1 specifically comprises:

zooming the color endoscopic image to a set picture resolution (for example, 512×512 picture resolution), and then performing pixel mean normalization on the color endoscopic image so that data has a zero mean and a unit variance in each dimension.

Further, the step S2 specifically comprises:

using ResNeXt101 pre-trained based on an ImageNet picture dataset as a backbone network;

dividing the backbone network into multiple different stages with maxpooling as a boundary;

with the deepening of the backbone network, reducing the size of the feature map after each pooling by at least a half, and at least doubling the number of channels; and extracting the network outputs of the rest stages in the multiple different stages except the first stage as the extracted feature maps.

For example, in one embodiment, the step S2 specifically comprises:

using ResNeXt101 pre-trained based on an ImageNet picture dataset as a backbone network;

dividing ResNeXt101 into 5 different stages R1, R2, R3, R4 and R5 with maxpooling as a boundary;

with the deepening of the backbone network, reducing the size of the feature map after each pooling by at least a half, and at least doubling the number of channels;

extracting network outputs C2-C5 of four stages R2-R5 as the extracted feature maps.

Further, the step S3 specifically comprises:

enhancing the semantic information of the shallow feature layer in the feature map extracted in step S2 by using a top-down approach with a feature pyramid network to acquire a shallow feature map with deep information, and simultaneously expanding the feature pyramid structure upward by at least one layer to obtain a feature map with deeper semantic information.

In one embodiment, the step S3 specifically comprises:

enhancing the semantic information of the shallow feature layers of C2-C5 by using a top-down method of a feature pyramid structure to acquire shallow feature maps P2, P3, P4 and P5 having deep information, and simultaneously upward extending the feature pyramid structure by one layer to acquire feature map P6 with deeper semantic information.

Further, the step S4 specifically comprises the following steps:

S400: for feature points of different feature layers, giving different labels according to the sizes of target polyps in the training stage and distributing the labels to different scales of feature layers as actual labels, wherein the object box information of the actual label is used for regression function to calculate the position of a candidate box;

S401: applying an anchor-free detection algorithm to the enhanced feature and the extended feature to acquire Center-ness comprising a H×W×4 tensor for position prediction, a H×W×1 dimensional prospect prediction mask and a H×W×1 tensor for measuring the degree to which the current pixel is offset from the center point of the real target, wherein H and W are respectively height and width of the tensor;

S402: performing position information decoding on the H×W×4 tensor, where the output of the feature point at position (x,y) on the feature map is predicted as [l*,r*, t*,b*], l*,r*,t* and b* are distances from the feature point (x,y) to left, right, upper and lower sides of the prediction box, respectively, $x_0=x-l^*$, $y_0=y-t^*$, $w=l^*-r^*$, and $h=t^*+b^*$, the position of the predicted object obtained by decoding is $[x_0,y_0,w,h]$, $(x_0,y_0)$ is the coordinates of the upper left corner of the object prediction box, and w and h are the width and height of the object prediction box, respectively;

S403: performing distance thermal value calculation on a regression value of position information corresponding to each feature point output by Center-ness in the H×W×1 tensor to help the target judgment of the feature point on the polyp at the current position, wherein a specific formula is as follows:

$$\sqrt{\left\{\frac{\min(l^*, r^*)}{\max(l^*, r^*)} \times \frac{\min(t^*, b^*)}{\max(t^*, b^*)}\right\}}$$

where, min (x,y) is a minimal value of x and y, and max (x, y) is a maximum value of x,y, in the training stage, calculating a loss value by using the generated distance heatmap and Center-ness with the size of H×W×1 tensor as inputs and utilizing a two-class cross-entropy function as a loss function, when the feature point is closer to the center of the prediction box, the value of the loss function is smaller, conversely, the value of the loss function is larger.

Where, the training process in step S400 is a universal visional target detection and training process, a training sample is a color endoscopic image having a polyp lesion position marker.

Further, in step S5, the operation of extracting the global feature vector from the extended feature comprises:

performing an average pooling operation on the extended feature of the feature pyramid to acquire the global feature vector with a dimension of 256×1, where the extended feature map has a set stride (for example, stride=128).

Further, in step S5, the operation of extracting the local feature vector from the foreground prediction mask comprises:

S500: introducing a prospect attention mechanism, superimposing the outputs of the prospect prediction mask and the corresponding feature map of the feature pyramid that are convoluted, then remaining the prospect part of the feature map corresponding to the prospect mask, whereas ignoring the background part, thereby acquiring the local feature map, wherein the calculation formula is as follows:

$M_{local}=M^*a$

M is the feature map output by the feature pyramid, a is the prospect mask, * is an array element product, and $M_{local}$ is the local feature map;

S501: applying a global average pooling operation on all the local feature maps acquired in step S500 to acquire a first local feature vector with a dimension of 256×1.

Further, in step S5, the operation of combining local feature vector with the global feature vector so as to predict the type of polyps through a full-connection layer comprises:

combining multiple first local feature vectors (for example, 5 256×1-dimensional first local feature vectors) to generate a second local feature vector (for example, 1280×1-dimensional second local feature vector), then performing dimensionality reduction on the second local feature vector via a convolution layer (for example, a 1×1×256 convolution layer) to acquire a third local feature vector (for example, 256-dimensional third local feature vector), then combining the third local feature vector with the global feature vector to generate a feature vector with a certain dimension (for example, 512×1 dimension), and finally predicting the types of polyps through the full-connection layer.

Further, a non-maximum suppression operation is applied to the predicted object position in step S402 to remove excessive superimposed prediction box.

Compared with the prior art, the method of the present application utilizes the feature pyramid model to enhance and upward extend the extracted feature to acquire the extended feature of the deeper layer, position decoding is performed on the feature map through the anchor-free detection algorithm to acquire the polyp prediction box and the prospect prediction mask, and finally the prospect attention mechanism is introduced, and the prospect prediction mask is superimposed with the feature map of the corresponding layer, so as to acquire the feature map with local feature information, and the type of polyps is better predicted by combining global and local information, so as to improve the detection rate of the polyps and the accuracy rate of pathological classification.

BRIEF DESCRIPTION OF THE DRAWINGS

Next, the technical solution of the present application will be further illustrated in combination with drawings.

DETAILED DESCRIPTION OF THE EMBODIMENTS

Next, the present application will be further illustrated in detail in combination with drawings and specific embodiments. It should be understood that the specific embodiments described here are only for explaining, but not limiting, the present application.

A method for detection and pathological classification of polyps via colonoscopy based on an anchor-free technique provided by an embodiment of the present application comprises the following steps:

S001: a color endoscopic image is pretreated. Because the resolutions of output pictures are different due to different endoscope devices in actual application, for the sake of subsequent feature extraction, first, the color endoscopic image is zoomed to 512×512 picture resolution, and then pixel average value normalization is performed on the image so that data has a zero mean value and a unit variance in each dimension.

S002: feature extraction is performed on the color endoscopic image that is pretreated. The specific process is as follows: feature extraction is performed on the picture by using a backbone network. In this example, ResNeXt101 pre-trained based on an ImageNet picture dataset is used as the backbone network; ResNeXt101 is divided into 5 different stages (R1, R2, R3, R4 and R5) with maxpooling as a boundary.

Figure 1:
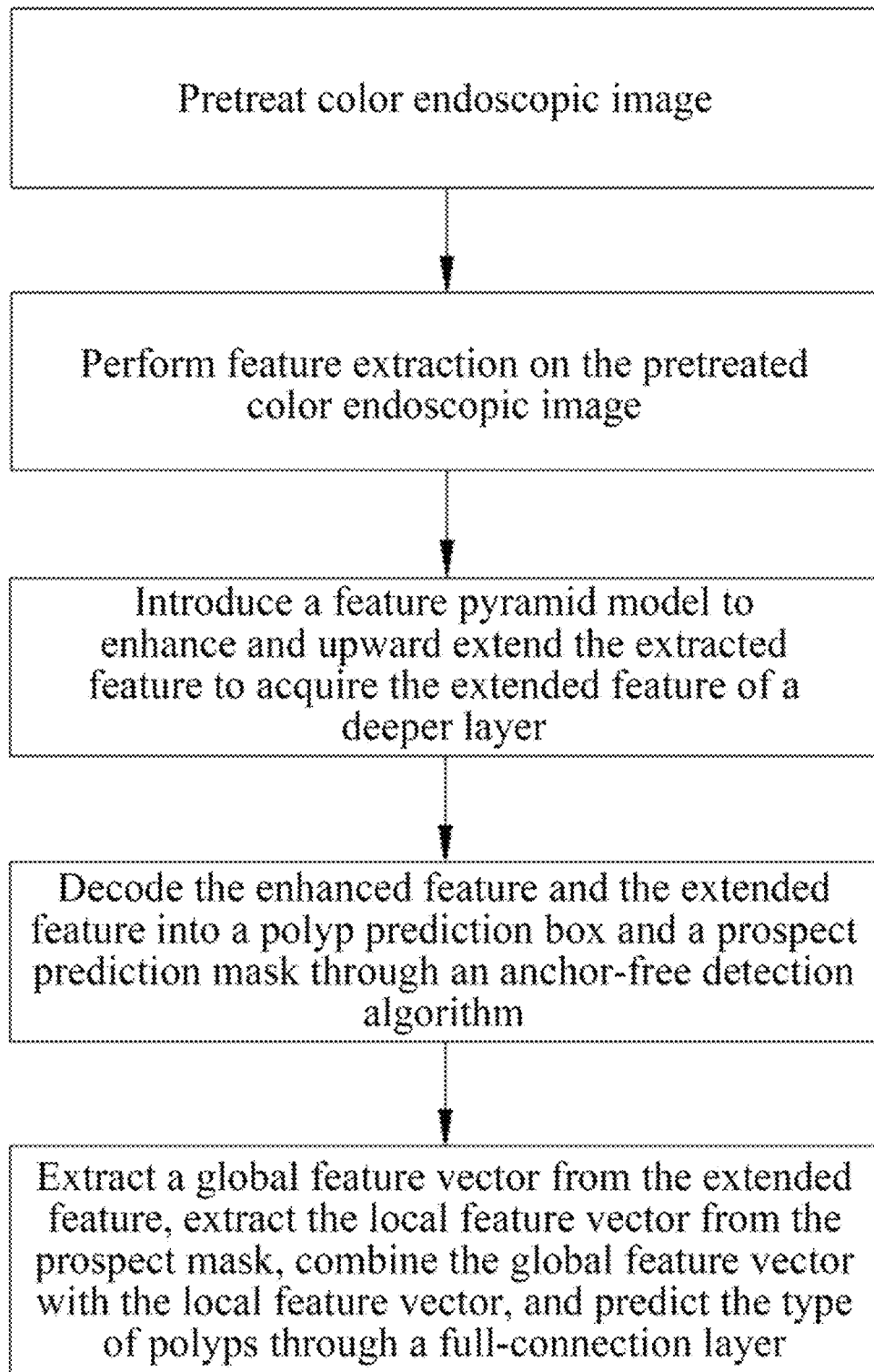
FIG. 1 is a flowchart of method for detection and pathological classification of polyps via colonoscopy based on an anchor-free technique in an embodiment of the present application.
Figure 2:
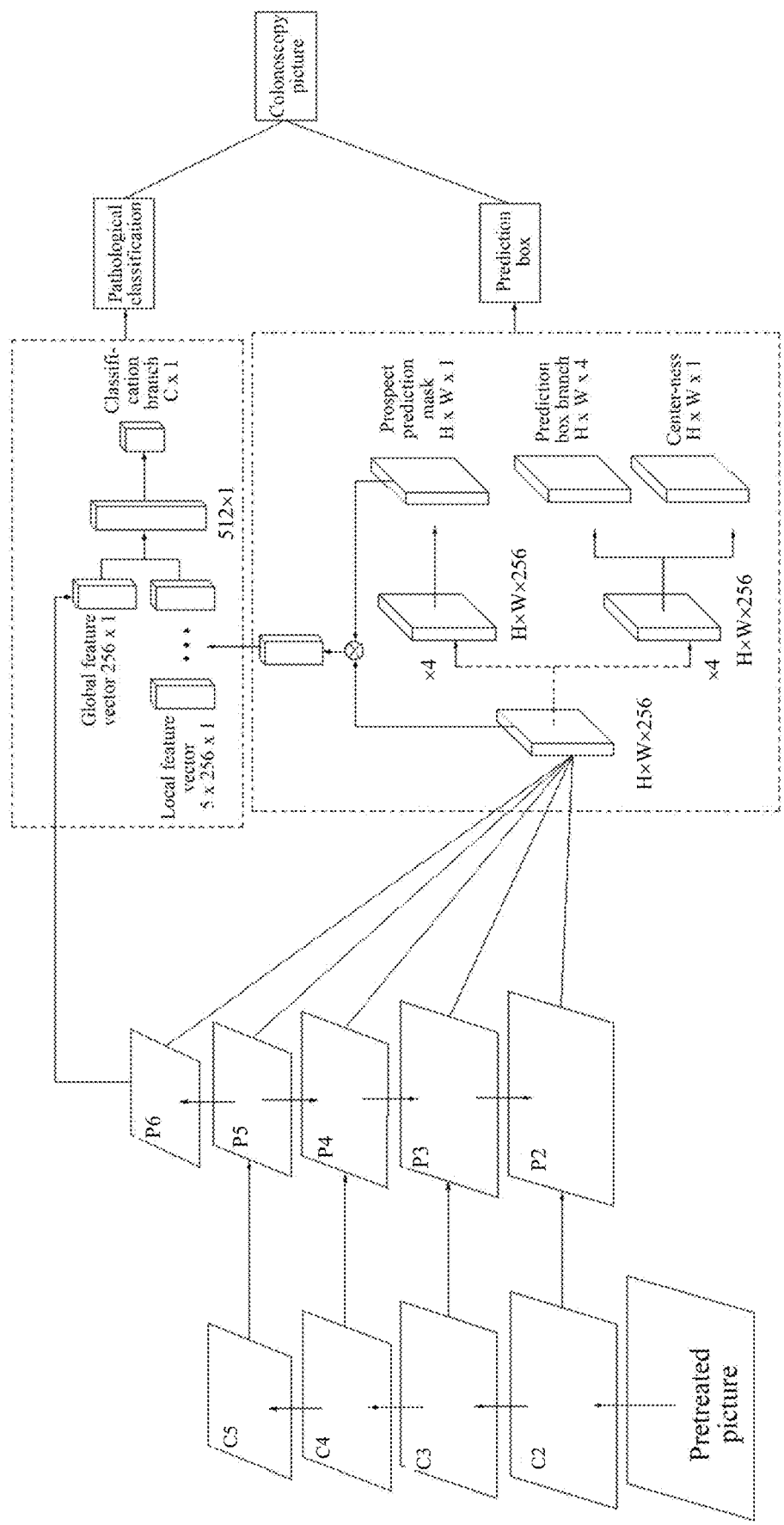
FIG. 2 is a detection process diagram of method for detection and pathological classification of polyps via colonoscopy based on an anchor-free technique in an embodiment of the present application.

With the deepening of the backbone network, the size of the feature map after each pooling is reduced by at least a half, and the number of channels is at least doubled, so as to acquire abstract information having larger field of vision; in this example, network outputs C2, C3, C4 and C5 of four stages R2-R5 are extracted as inputs of the subsequent feature pyramid network, wherein the structure of the backbone network is as shown in the left part of FIG. 2 (Backbone).

S003: to solve the problems that after pooling for many times, the deep network has increased semantic information but is insensitive to small objects, and has few shallow semantic information and low accuracy rate, in this example, the semantic information of the shallow feature layer is enhanced by using a top-down method of a feature pyramid structure so as to improve the accuracy rate of the shallow network on small objects.

By sampling on the deep feature map and combining with the shallow feature map, the abstract information having larger field of vision is introduced into the shallow feature map to acquire shallow feature maps (P2, P3, P4 and P5) having deep information to help the detection of small objects.

Meanwhile, in this example, the above feature pyramid structure is upward extended by one layer to acquire the semantic information (P6) of the deeper layer to help the detection of large polyps and global image classification, wherein the feature pyramid structure is as shown in the middle part of FIG. 2 (FPN).

S004: the feature information of the enhanced feature and the extended feature is decoded through an anchor-free detection algorithm to acquire a polyp prediction box and a prospect prediction mask.

Specifically, the operations of steps S100-S103 are performed on five-layer outputs (P2-P6) of the feature pyramid, and the weights of different layers are shared, so as to promote the running speed.

S100: since the maxpooling operation is introduced into the backbone network to reduce the size of the feature map to acquire larger field of vision, the feature points of different feature maps correspond to different sized regions of the original map, different labels are given to the feature points of different feature layers in the training stage according to the sizes of target polyps and the labels are allocated to different scales of feature layers as actual labels; the object box information with actual labels is used for regression function to calculate the positions of candidate boxes, and the labels of types of polyps are used for subsequent steps to calculate a loss function by using cross entropy.

S101: the outputs of the five-layer feature maps P2-P6 of the feature pyramid are decoded through the anchor-free detection algorithm to acquire a H×W×4 tensor as output and the prediction box of the target is calculated based on the tensor, in addition, a H×W×1 dimensional prospect prediction mask is obtained.

Specifically, the process of the anchor-free detection algorithm is as follows: first, the five-layer feature maps of P2-P6 pass through a group of convolution layers to acquire H×w×256 feature maps, then pass through two groups of different convolution layers and respectively undergo convolution for 4 times to acquire two different H×W×256 feature maps, and one of the H×W×256 feature maps is convoluted to acquire a H×W×1 dimensional prospect prediction mask.

The other H×W×256 feature map passes through two different convolution layers again to acquire Center-ness comprising a H×W×4 tensor for position prediction and a H×W×1 tensor for measuring the degree to which the current pixel is offset from the center point of the real target.

S102: position information decoding is performed on the above-mentioned H×W×4 tensor for position prediction by using the following function in the prediction stage:

the output of the feature point at position (x,y) on the feature map is predicted as [l*,r*,t*,b*], l*,r*,t* and b* are respectively distances from the feature point (x,y) to left, right, upper and lower side frames of the prediction box, wherein $x_0=x-l^*$, $y_0=y-t^*$, $w=l^*-r^*$, and $h=t^*+b^*$.

The position of the predicted object is $[x_0,y_0,w,h]$ through decoding, $(x_0,y_0)$ is the coordinates of the upper left corner of the object prediction box, and w and h are respectively the width and height of the object prediction box.

In addition, 4-dimensional position information is generated for all the feature points on the five-layer feature map, the position information of the point whose corresponding feature point output as the prospect in the corresponding prospect prediction mask, and the prediction box of the object position is decoded, the prediction boxes with a confidence coefficient of 100 are taken, and the prediction boxes with a confidence coefficient of less than 100 are retained.

S103: distance thermal value calculation is performed on the position regression value of position information corresponding to each feature point output by the branch of Center-ness in H×W×1 tensor to help the target judgment of the feature point on the polyp at the current position, wherein a specific formula is as follows:

$$\sqrt{\left\{\frac{\min(l^*, r^*)}{\max(l^*, r^*)} \times \frac{\min(t^*, b^*)}{\max(t^*, b^*)}\right\}}$$

wherein, min (x,y) is a minimal value of x and y, and max (x, y) is a maximum value of x, y. In the training stage, a loss value is calculated by using the generated distance thermal value and the H×W×1 tensor output by the center-ness branch and utilizing a two-class cross-entropy function as a loss function.

When the feature point is closer to the center of the prediction box, the value of the loss function is smaller, conversely, the value of the loss function is larger.

S005: the global feature vector is extracted from the extended feature, the local feature vector is extracted from the prospect prediction mask, the global feature vector is combined with the local feature vector, and then the type of the polyps is predicted through the full-connection layer.

Specifically, a prospect attention mechanism is introduced in step S200, array element product superimposing is performed on the prospect prediction mask and H×W×256 feature map output of the corresponding feature maps P2-P6 of the feature pyramid acquired by being convoluted; after this operation, the part of the feature map corresponding to the prospect of the prospect mask is retained, whereas the background part will be ignored, so as to acquire the global feature map; the local feature vector is combined with the global feature vector to improve the accuracy of the whole image classification.

$$M_{local} = M * a$$

M is the feature map output by the feature pyramid, a is the prospect mask, * is an array element product, and $M_{local}$ is the local feature map;

S201: global average pooling operation is applied to all the local feature maps to acquire a first local feature vector with a dimension of 256×1.

In addition, the average pooling operation is performed on the P6 feature vector of the feature pyramid to acquire the global feature vector with a dimension of 256×1, wherein the P6 feature map has a stride of stride=128, and therefore has the maximum field of vision. Thus, the P6 feature map has the most abstract global semantic information, which is conducive to the classification prediction of images.

Subsequently, the local feature vector is combined with the global feature vector, and the type of polyps is predicted through a full-connection layer, the 5 256×1 dimensional local feature vectors are combined to generate 1280×1-dimensional second local feature vector, then dimensionality reduction of 1×1×256 convolution layer is performed to acquire a 256-dimensional local feature vector, then the local feature vector is combined with the global feature vector to generate a 512×1 dimensional feature vector, and finally the type of polyps is predicted through the full-connection layer.

Finally, a non-maximum suppression operation is applied to the predicted object position acquired by decoding to remove excessive superimposed prediction box, so as to acquire the predicted polyp box, the predicted polyp classification is used as the type of all the detected polyps in this picture, and the polyp prediction box and type information will be superimposed on the original input colorectal endoscope picture as an output.

Next, several actual detection example diagrams will be listed to illustrate the method of the present application.

Figure 3:
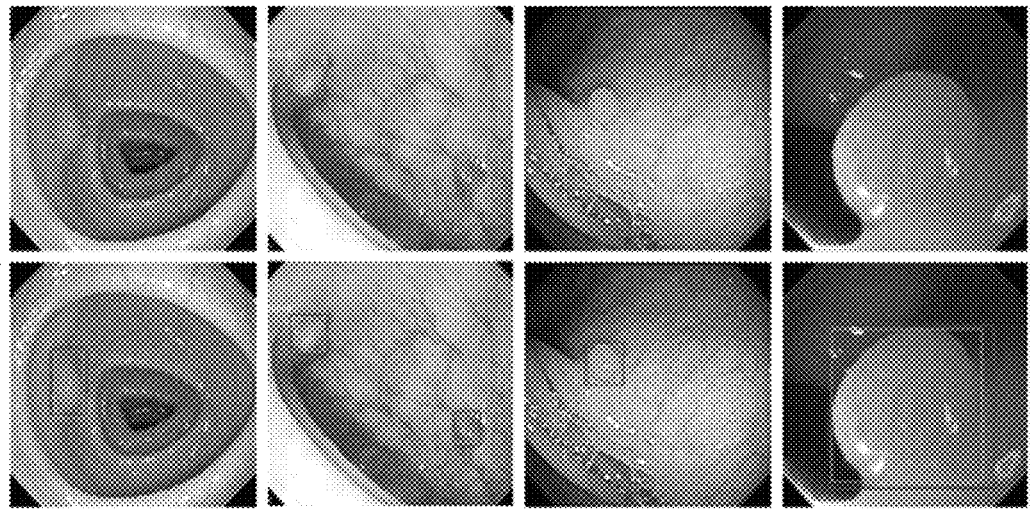
FIG. 3 is a polyp detection result diagram showing adenoma polyps is determined through pathological classification in an embodiment of the present application.

Referring to FIG. 3, the upper four pictures are original pictures, the lower four pictures are the predicted results of the relevant polyp positions, and the final left text is the predicted pathological classification, and the final result of the pathological classification is adenoma. This is completely consistent with the actual pathological classification results.

Figure 4:
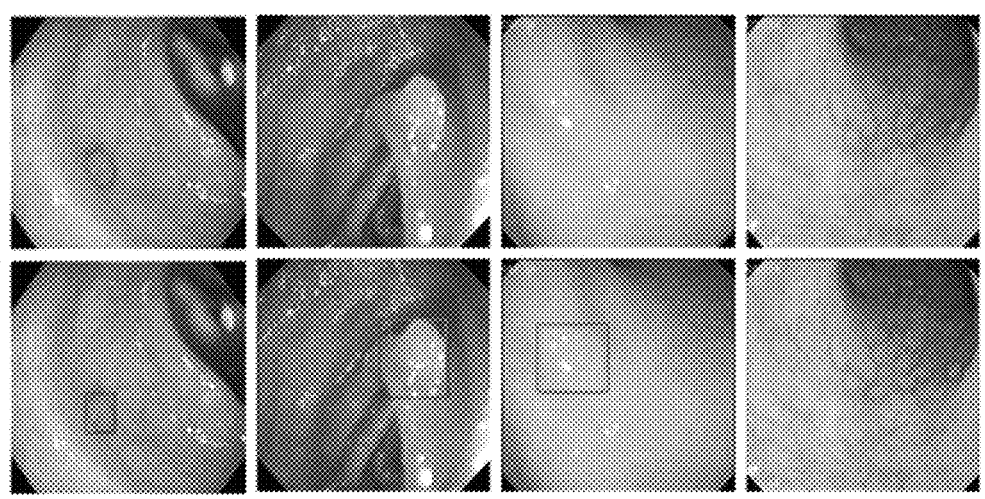
FIG. 4 is a polyp detection result diagram showing non-adenoma polyps is determined through pathological classification in an embodiment of the present application.

Referring to FIG. 4, the upper four pictures are original pictures, the lower four pictures are the predicted results of the relevant polyp position, and the final left text is the predicted pathological classification, and the final result of the pathological classification is non-adenoma. This is completely consistent with the actual pathological classification results.

Moreover, the applicant has also verified the effectiveness and accuracy of the method in this example by using other known cases. The results show that the method in this example can conveniently and accurately detect the location of relevant polyps and improve the accuracy of pathological classification.

The method for detection and pathological classification of polyps via colonoscopy based on an anchor-free technique of the present application utilizes a feature pyramid model to enhance and upward extend the extracted features to acquire the extended feature of the deeper layer, then the position decoding is performed on the feature map by an anchor-free detection algorithm to acquire a polyp prediction box and a prospect prediction mask; and finally, the prospect attention mechanism is introduced to overlap the prospect prediction mask with the feature map of the corresponding layer to acquire the feature map having local feature information, the type of polyps is better predicted by combing global and local information to improve the detection rate of polyps and the accuracy rate of pathological classification.

The above descriptions are only specific application examples of the present application, and do not limit the protective scope of the present application. Technical solutions acquired by using equivalent change or equivalent replacement are all included within the protective scope of the present application.

What is claimed is:
1. A method for detection and pathological classification of polyps via colonoscopy based on an anchor-free technique, comprising the following steps:
pretreating a color endoscopic image;
performing feature extraction on the color endoscopic image that is pretreated;
introducing a feature pyramid model to enhance the performing of feature extraction on the color endoscopic image that is pretreated to acquire an enhanced feature, and upward extending the enhanced feature to acquire an extended feature of a deeper layer;
decoding feature information of the enhanced feature and the extended feature through an anchor-free detection algorithm to acquire a polyp prediction box and a prospect prediction mask;
extracting a global feature vector from the extended feature and extracting a local feature vector from the prospect prediction mask, and combining the global feature vector with the local feature vector, to predict a type of polyps through a full-connection layer;
wherein the steps of performing feature extraction on the color endoscopic image that is pretreated are as follows:
using ResNeXt101 pre-trained based on an ImageNet as a backbone network;
dividing the ResNeXt101 into 5 different stages of R1, R2, R3, R4, and R5 with a maxpool as a boundary;

with a deepening of the backbone network, reducing the size of a feature map acquired after each pooling by a half, and doubling the number of channels; and extracting the network outputs of C2 to C5 in the 4 different stages of R2 to R5 as the extracted feature map;

the steps of introducing a feature pyramid model to enhance the feature extracted to acquire an enhanced feature, and upward extending the enhanced feature to acquire an extended feature of a deeper layer are as follows:

enhancing semantic information of a shallow feature layer by using a top-down method of a feature pyramid structure to acquire shallow feature maps P2, P3, P4, and P5 having deep information, and meanwhile upward extending the feature pyramid structure by one layer to acquire a semantic information feature map P6 of the deeper layer;

the steps of decoding the feature information of the enhanced feature and the extended feature through an anchor-free detection algorithm to acquire a polyp prediction box and a prospect prediction mask are as follows:

S100: for feature points of different feature layers in a training stage, giving different labels according to the sizes of target polyps and allocating the labels to different scales of feature layers as actual labels, wherein object box information with actual label is used for a regression function to calculate positions of a candidate boxes;

S101: acquiring H×W×4 tensor for position prediction, a H×W×1 dimensional prospect prediction mask and a H×W×1 tensor Center-ness for measuring the degree to which a current pixel is offset from the center point of a real target;

S102: performing position information decoding on the H×W×4 output tensor, wherein the output of a feature point x, y on the feature map is predicted as [l*,r*,t*,b*], l*,r*,t* and b* are respectively distances from the feature point x, y to left, right, upper and lower sides of the polyp prediction box, $x_0 = x - l^*$, $y_0 = y - t^*$, $w = l^* - r^*$, and $h = t^* + b^*$, the position of the predicted polyp is [$x_0, y_0, w, h$] via decoding, wherein $x_0$, $y_0$ are coordinates of an upper left corner of the polyp prediction box, and w and h are respectively a width and height of the polyp prediction box;

S103: performing distance thermal value calculation on position information regression value corresponding to each feature point on a H×W×1 tensor output by Center-ness to help a target judgment of the feature point on the polyp at the current position, wherein the specific formula is as follows:

$$\sqrt{\left\{\frac{\min(l^*, r^*)}{\max(l^*, r^*)} \times \frac{\min(t^*, b^*)}{\max(t^*, b^*)}\right\}}$$

wherein, min (x,y) is a minimal value of x and y, and similarly max (x, y) is a maximum value of x, y, in the stage of training, calculating a loss value by using a distance thermogram and the H×W×1 tensor output by Center-ness, and utilizing a two-class cross-entropy function as a loss function, when the feature point is closer to the center of the prediction box, the value of the loss function is smaller, conversely, the value of the loss function is larger;

the steps of extracting the global feature vector from the extended feature are as follows:

performing an average pooling operation on the extended feature of the feature pyramid to acquire a 256×1 dimensional global feature vector, wherein the extended feature degree has a stride of 128;

the steps of extracting the local feature vector from the prospect prediction mask are as follows:

S200: introducing a prospect attention mechanism, superimposing the outputs of the prospect prediction mask and the corresponding feature map of the feature pyramid that are convoluted, and then retaining a prospect part of the feature map corresponding to the prospect mask, whereas ignoring a background part, to acquire the local feature map; wherein the calculation formula is as follows:

$M_{local} = M * a$

M is the feature map output by the feature pyramid, a is the prospect mask, * is an array element product, and $M_{local}$ is the local feature map;

S201: applying a global average pooling operation on all local feature maps to acquire a 256×1 dimensional local feature vector; and the steps of combining the local feature vector with the global feature vector to predict the type of polyps through a full-connection layer are as follows:

combining 5 256×1 dimensional local feature vectors to generate a 1280×1 local feature vector, then performing dimensionality reduction on the 1280×1 local feature vector via a 1×1×256 convolution layer to acquire a 256 dimensional local feature vector, then combining the local feature vector with the global feature vector as a 512×1 dimensional feature vector, and finally predicting the types of polyps through a full-connection layer.

2. The method for detection and pathological classification of polyps via colonoscopy based on an anchor-free technique according to claim 1, wherein the steps of pretreating a color endoscopic image are as follows:

zooming the color endoscopic image to a 512×512d picture resolution, and then performing pixel mean normalization on the color endoscopic image so that data has a zero mean and a unit variance in each dimension.

3. The method for detection and pathological classification of polyps via colonoscopy based on an anchor-free technique according to claim 1, wherein a non-maximum suppression operation is applied to the predicted polyp position in step S102 to remove an excessive superimposed prediction box.

* * * * *